MULTIPLE PASS DESIGN FOR ONCE-THROUGH STEAM GENERATORS

Original Filed May 27, 1964 13 Sheets-Sheet 1

INVENTORS
WALTER P. GORZEGNO
FREDERICK H. WEBER & ROBERT H. PAI

BY Richard H. Thomas ATTORNEY

MULTIPLE PASS DESIGN FOR ONCE-THROUGH STEAM GENERATORS

Original Filed May 27, 1964

INVENTORS
WALTER P. GORZEGNO, FREDERICK H. WEBER
& ROBERT H. PAI
BY
Richard H. Thomas
ATTORNEY INVENTORS
WALTER P. GORZEGNO, FREDERICK H. WEBER
& ROBERT H. PAI.
BY
Richard H. Thomas
ATTORNEY Feb. 13, 1968 W. P. GORZEGNO ET AL 3,368,534

MULTIPLE PASS DESIGN FOR ONCE-THROUGH STEAM GENERATORS

Original Filed May 27, 1964 13 Sheets-Sheet 6

INVENTORS
WALTER P. GORZEGNO, FREDERICK H. WEBER
& ROBERT H. PAI.
BY
Richard H. Thomas
ATTORNEY

MULTIPLE PASS DESIGN FOR ONCE-THROUGH STEAM GENERATORS

Original Filed May 27, 1964

INVENTORS
WALTER P. GORZEGNO
FREDERICK H. WEBER & ROBERT H. PAI.

BY Richard H. Thomas ATTORNEY

MULTIPLE PASS DESIGN FOR ONCE-THROUGH STEAM GENERATORS

INVENTORS
WALTER P. GORZEGNO
FREDERICK H. WEBER
ROBERT H. PAI.
BY
Richard H. Thomas
ATTORNEY

MULTIPLE PASS DESIGN FOR ONCE-THROUGH STEAM GENERATORS

Original Filed May 27, 1964

INVENTORS
WALTER P. GORZEGNO
FREDERICK H. WEBER
ROBERT H. PAI.
Richard H. Thomas
ATTORNEY

FLUID TEMPERATURE IN 4-PASS FURNACE.

MULTIPLE PASS DESIGN FOR ONCE-THROUGH STEAM GENERATORS

INVENTORS
WALTER P. GORZEGNO
FREDERICK H. WEBER
ROBERT H. PAI.
BY
Richard H. Thomas
ATTORNEY

1

3,368,534

MULTIPLE PASS DESIGN FOR ONCE-THROUGH STEAM GENERATORS

Walter P. Gorzegno, Florham Park, N.J., Frederick H. Weber, Syosset, N.Y., and Robert H. Pai, East Orange, N.J., assignors to Foster Wheeler Corporation, Livingston, N.J., a corporation of New York Original application May 27, 1964, Ser. No. 370,604, now Patent No. 3,324,837, dated June 13, 1967. Divided and this application Feb. 2, 1967, Ser. No. 613,641
2 Claims. (Cl. 122—480)

ABSTRACT OF THE DISCLOSURE

A once-through vapor generator in which the convection section of the generator includes three passes in parallel, two of the passes housing intermediate and low pressure reheat surfaces respectively, the third pass housing an economizer section with accompanying advantages.

*Cross-references to related applications*

This application is a divisional application of co-pending United States application Ser. No. 370,604, filed May 27, 1964, by Walter P. Gorzegno et al., now Patent No. 3,324,837. In addition, it relates to United States application Ser. No. 501,169, filed Oct. 22, 1965, and United States application Ser. No. 501,269, filed Oct. 22, 1965.

*Background*

The "Benson" principle, concerning the use of heated riser tube circuits coupled to unheated downcomer circuits for an enclosure wall design for once-through vapor generators, has found wide acceptance in Europe, and more recently in the United States and Japan. In Europe, this "Benson" principle is usually associated with a skin cased construction, in which the tubes or tube panels lining the combustion chamber are encased by a metal casing and insulation providing a gas-tight construction.

It is known in the construction of an all-welded membrane wall, defining a fluid heating enclosure for a forced-flow vapor generating unit, to route the boundary wall circuits in an up-down-up pattern continuously repeating itself around the periphery of the unit. However, the fluid enthalpy pick-up of a single circuit is of necessity high requiring constant operation of a gas recirculation fan to limit furnace circuit absorption. In addition, the up-down-up circuity required in general a higher fluid velocity, than a straight upflow circuit, to achieve satisfactory circuit characteristics from a stability and sensitivity point of view.

Another prior development illustrates the construction of a partially welded boundary wall fluid heating enclosure for forced-flow vapor generating units wherein the boundary wall circuit consists of two upflow passes. The first upflow pass contains subcooled fluid and the second upflow pass contains fluid in the liquid and vapor phases. The two passes are present in alternating arrangement around the periphery of the furnace in the burner zone. However, in this development the burner zone area is skin cased and only the remainder of the furnace enclosure uses an all-welded membrane type construction. It is impossible to extend the all-welded membrane type

2 construction into the burner zone area, since the fluid enthalpy pick-up in each pass in the burner zone is so high as to cause a temperature differential between adjacent tubes sufficient to result in rupture of the enclosure.

Use of the "Benson" principle permits use of very high fluid pressures, and in some modern designs, the pressures within the tube circuits are above supercritical pressure, i.e., where there is no phase difference between vapor and liquid. Such high pressures permit the use of a plurality of turbines to bring down the temperature to condenser design pressures, and conventionally, high pressure, intermediate pressure and low pressure turbines are employed. However, it is necessary to increase the enthalpy content of the fluid between the turbine stages to ensure that condensation will not occur in any of the turbines. Reheat surfaces are used for this purpose, but heretofore, the location of these reheat surfaces has been a problem.

*Summary of the invention*

The present invention contemplates an improvement in this respect. In accordance with the invention, the furnace enclosure is provided with a gas outlet which leads to gas passage means comprising at least three gas passes in parallel. Each of the passes is baffled to regulate the flow of flue gas through the passes. For the intermediate and low pressure turbines, intermediate and low pressure reheat surfaces are provided, the intermediate pressure surface being disposed in one of the parallel gas passes and the low pressure reheat surface being disposed in the other of the parallel gas passes. This permits closely regulating the heat input into the respective reheat surfaces for closely controlling the enthalpy content of the fluid entering the respective turbines. In an embodiment of the invention, the third gas pass is occupied by the generator economizer section. When starting up the generator, all of the flue gas flow can be diverted to the passage housing the economizer section for maximum heat recovery and reduction in start-up time.

*Description of the drawings*

The invention and these and other advantages will become apparent upon consideration of the following specification with reference to the drawings, in which—

*Detailed description*

Figure 1:
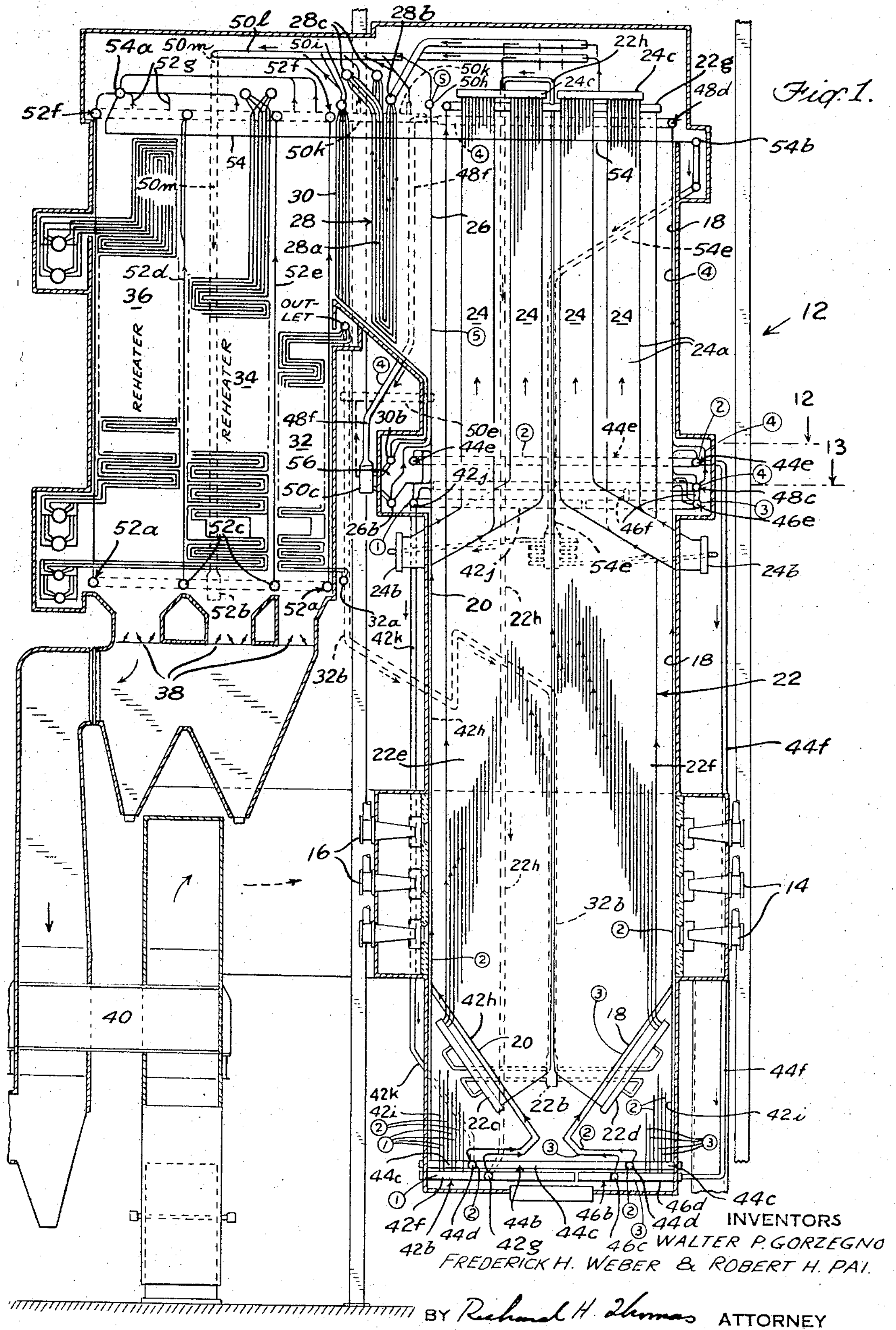
FIGURE 1 is a sectional side elevation view of a once-through vapor generating unit embodying the invention.

Referring to FIG. 1, the embodiment of the invention includes a furnace 12 for a forced circulation steam generating unit which has a rectangular horizontal cross-section and is vertically elongated. Burners 14 and 16 are disposed in the lower portion of the furnace setting in the front wall 18 and rear furnace wall 20 respectively. A single liquid cooled division wall 22 extending from front to rear in the furnace divides the furnace into two equal cells and extends the entire height of the furnace. In the upper portion of the furnace, superheater platens 24 are disposed in a preferred arrangement for drainability and optimum metal temperature design.

The flue gases from the combustion of fuel, leave the furnace enclosure by passing over a furnace exit screen 26, flowing in cross-flow relationship over a finishing superheater bank 28 and through a rear screen 30. These gasses then enter the convection section of the unit which consists of an economizer pass 32, a high pressure reheater pass 34, and a low pressure reheater pass 36. The quantity of flue gas flow through each of these three passes is controlled as necessary by outlet dampers 38 to achieve desired design flue temperatures. The flue gases exiting through the dampers 38 flow through an air heater 40, a dust collector (not shown) if coal fired, and then to the stack (also not shown).

Figure 2:
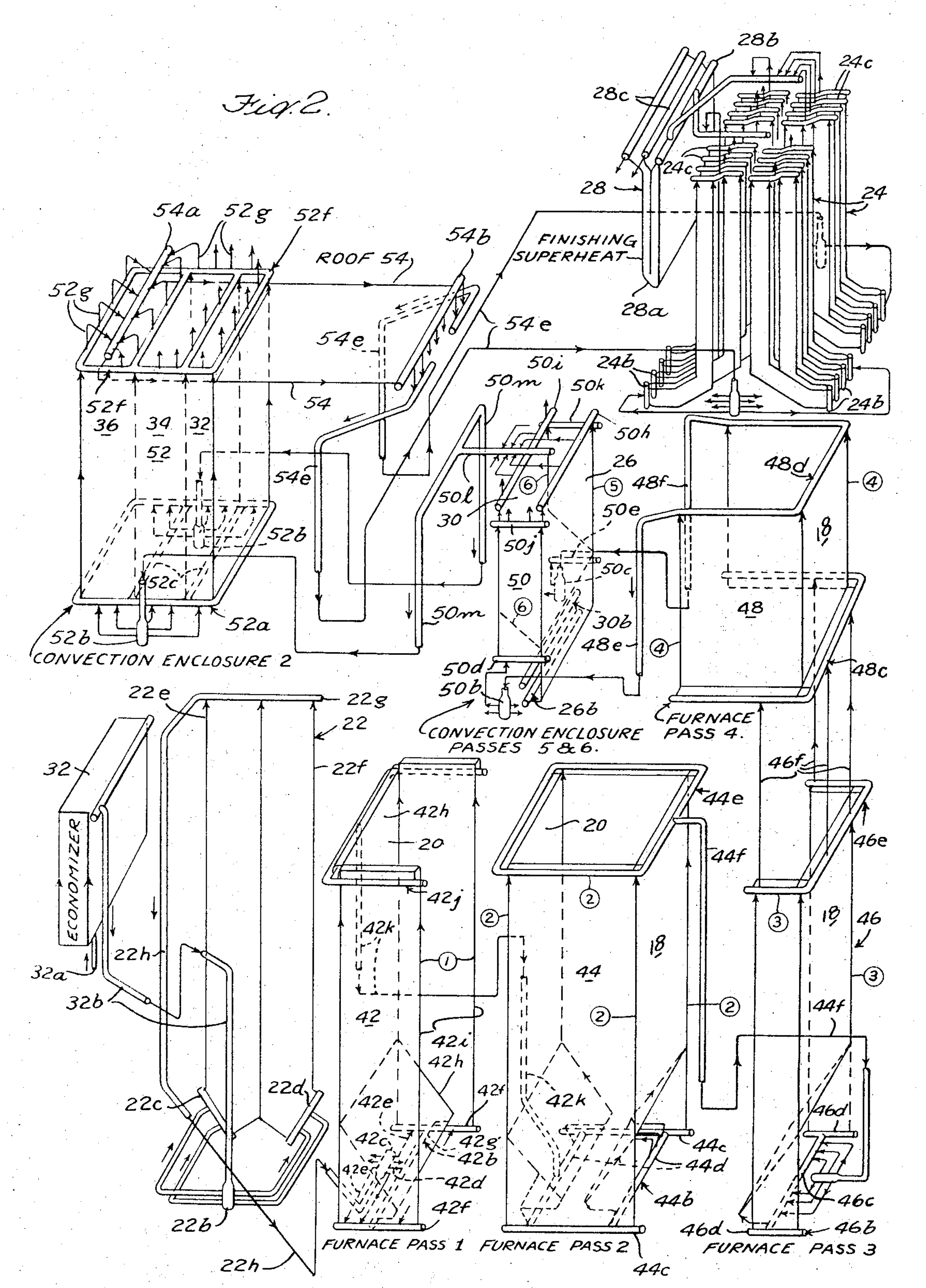
FIGURE 2 is an oblique schematic representation of the high pressure fluid flow path through the unit of FIG. 1.

FIG. 2 represents schematically the high pressure fluid flow routing for the unit. Feed water enters inlet 32*a* to the economizer 32, which is disposed in the flue passage therefor, and flows upwards exiting to a downcomer pipe 32*b* which feeds the inlet for division wall 22. The fluid from the division wall then routes in a similar fashion to a furnace pass No. 1 (42), furnace pass No. 2 (44), and furnace pass No. 3 (46), disposed in the lower, high heat absorption section of the furnace. The fluid from furnace pass No. 3 (46) then routes to the inlet of furnace pass No. 4 (48), which as will be shown makes up the side walls and front wall of the upper portion of the furnace. The fluid flows upwards in furnace pass No. 4, and exits through two downcomers 48*e* and 48*f* to feed the inlet of a first convection pass enclosure (50), which forms the boundary wall enclosures (furnace exit screen 26 and rear screen 30) for the pendant finishing superheater bank 28. In a similar fashion, as described in the foregoing, the fluid routes to a second convection pass enclosure (52), roof tubes 54, platen superheater 24, and pendant finishing superheater 28, in that sequence.

For the purpose of clarity, in the drawings wherever appropriate, the headers and tubes are designated with the pass number with which they are associated encircled so as to be clearly visible. For instance the tubes and headers for pass No. 1 are designated as ①, those for passes Nos. 2, 3, and 4 as ②, ③, and ④ respectively. For the first convection enclosure, the designations ⑤ and ⑥ are used. In addition, a conventional numbering system is used for designating particular elements. For instance, pass ① upper header is designated item 42*j*. It is believed that this system of numbering will facilitate reference and cross-reference to the drawings of the application.

Figures 3, 6:
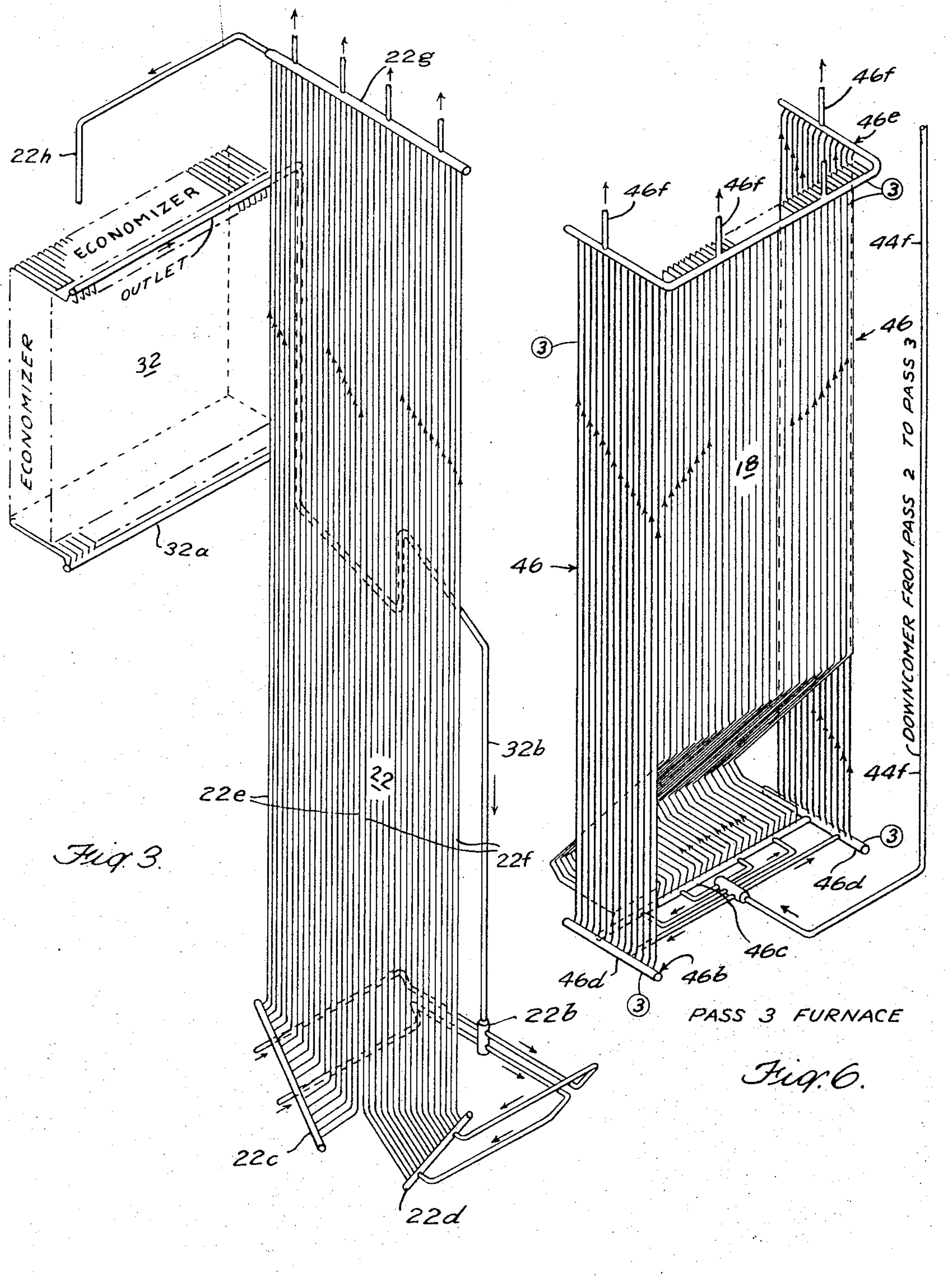
FIGURE 3 is an oblique detail view of the economizer and water cooled furnace division wall of the unit illustrated in FIG. 1.
FIGURES 4, 5, 6, and 7 are oblique details of furnace enclosure passes for the steam generator illustrated in FIG. 1.

Details of the furnace passes, convection enclosures, and superheating sections are shown more clearly in FIGS. 3–11. Referring to FIG. 3, showing the division wall 22, the downcomer 32*b* receiving flow from the economizer 32 leads to a tee 22*b* from which the fluid divides and flows into elongated spaced apart headers 22*c* and *d* attached to and from which sides 22*e* and *f* of the division wall extend. The headers 22*c* and *d* are inclined in the shape of a V conforming to the bottom of the furnace (FIG. 1).

Figures 4, 5:
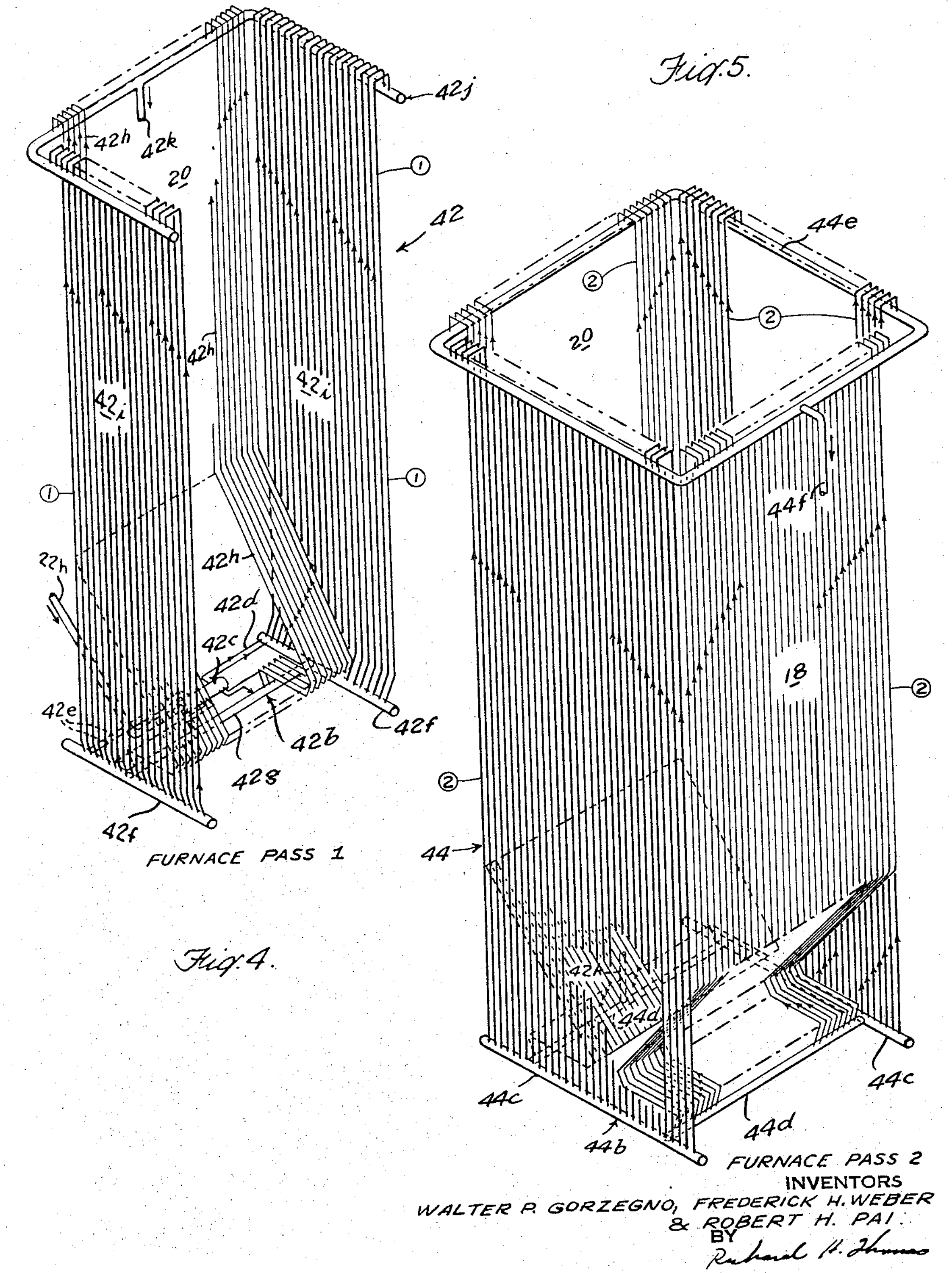

From the top of the division wall, a single straight header 22*g* leads to a downcomer 22*h* transmitting the fluid to furnace pass No. 1 (FIG. 4).

In the furnace pass No. 1, the fluid is transmitted to an I-shaped header 42*b*, via a distributing tee 42*c* and lines 42*d* and *e* leading to legs 42*f* and stem 42*g* respectively of the header. The stem 42*g* feeds a wall 42*h* which makes up the rear sloping bottom (FIG. 1) and rear wall 20 of the furnace 12. The legs 42*f* of the header feed tubes 42*i* which make up the side walls of the lower portion of the furnace. At the top of the pass No. 1, the tubes feed to a U-shaped header 42*j*. From the header 42*j* the fluid flows via a centrally disposed downcomer 42*k* to the furnace pass No. 2 (FIG. 5).

Figure 18A:
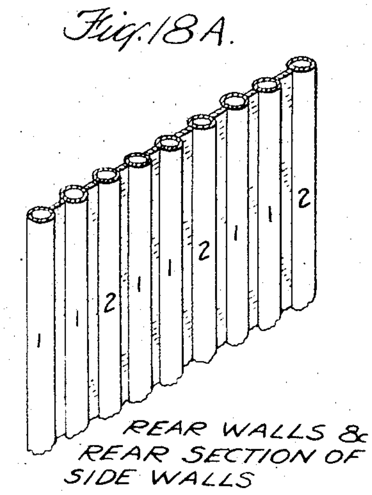
FIGURES 18A, 18B, and 18C are detail views showing tube arrangements in the furnace walls for the four pass furnace enclosure arrangement illustrated in FIG. 1.
Figure 18B:
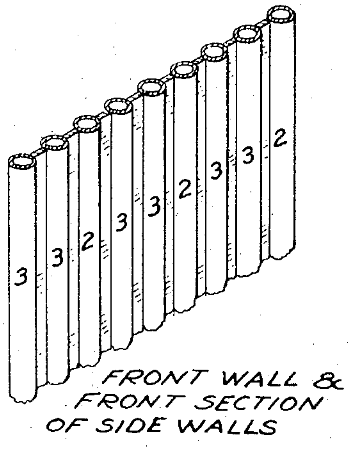
Figure 18C:
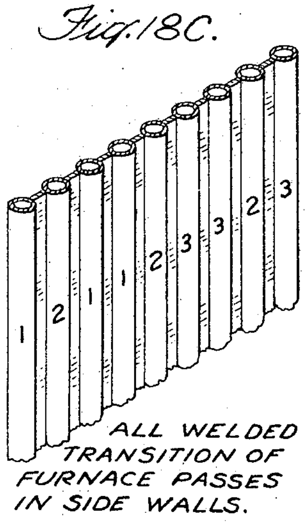

Feeding the furnace pass No. 2 is a double I-shaped header 44*b* having leg portions 44*c* and spaced parallel stems 44*d* extending between the legs 44*c*. The two stems 44*d* feed tubes which make up the V-shaped bottom of the furnace 12 (FIG. 1) and the front and rear walls 18 and 20 of the furnace. The tubes for pass No. 2 in the rear wall 20 of the furnace are mixed with those of pass No. 1 in the sequence noted in FIG. 18A, there being one tube from pass No. 2 succeeded by two tubes from pass No. 1. The legs of the header feed tubes which make up the side walls of the furnace, the tubes of pass No. 2 in the rear portion of the furnace being mixed with those of pass No. 1, also in the sequence shown in FIG. 18A, one tube of pass No. 2 being succeeded by two tubes of pass No. 1. The tubes in pass No. 2 in the side walls in the front portion of the furnace are mixed with those of pass No. 3, in a manner as will be shown, and in the sequence shown in FIG. 18B, with two tubes of pass No. 3 followed by a single tube of pass No. 2.

From the top of pass No. 2, from a rectangular-shaped header 44*e* the fluid flows through a single downcomer 44*f* to furnace pass No. 3 (FIGS. 2 and 6). The pass No. 3 utilizes an I-shaped header 46*b*, the stem 46*c* of the header feeding tubes making up the front wall 18 of the furnace, the legs 46*d* feeding tubes making up the side walls, front section thereof, of the furnace. As mentioned above, the tubes of pass No. 3 intermix in the side walls with the tubes of pass No. 2 in the sequence of FIG. 18B. They also intermix in the front wall 18 in this sequence with the tubes of pass No. 2; those leading from headers 44*d* (FIG. 5).

Figures 7, 8:
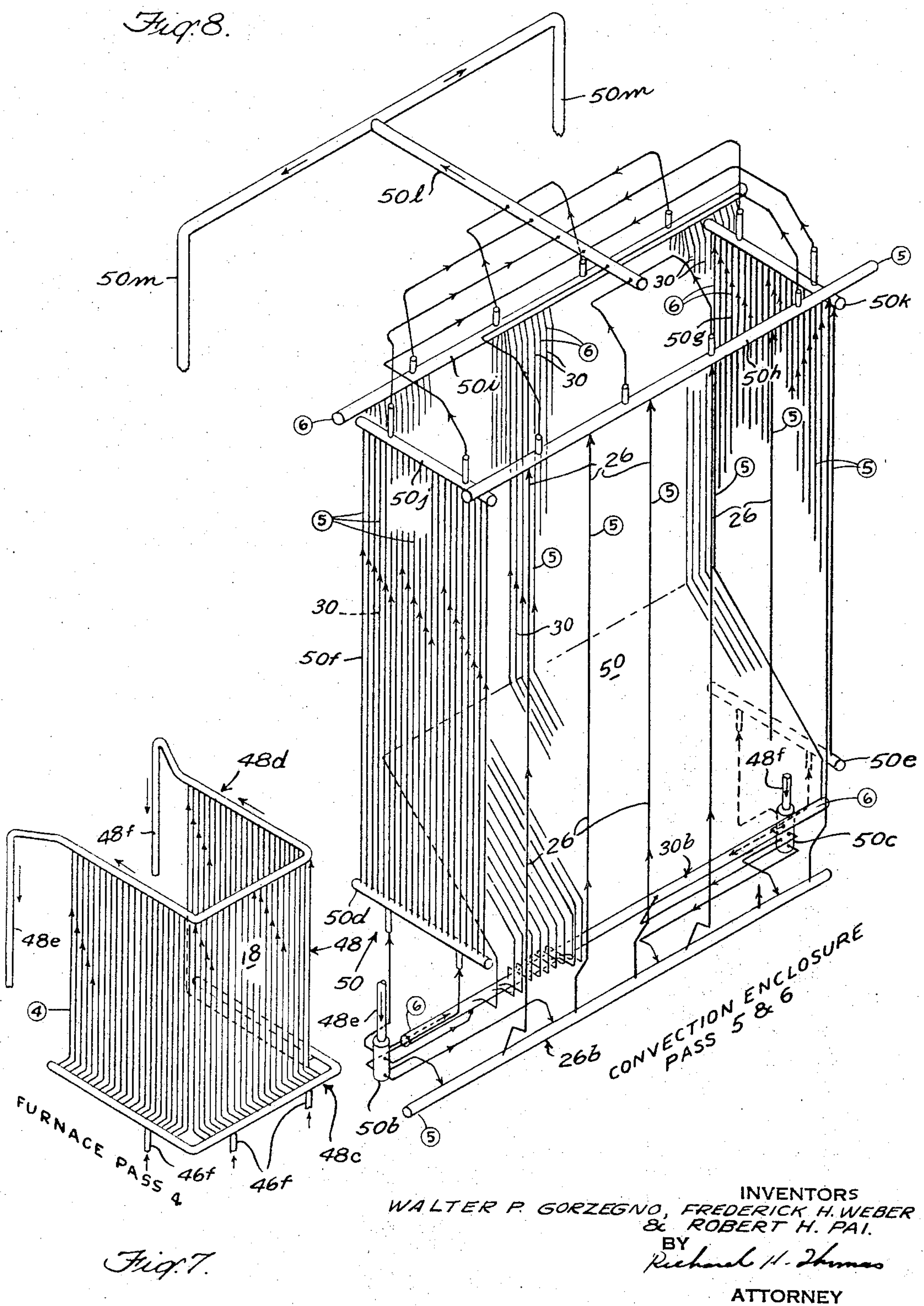
FIGURE 8 is an oblique detail of a first convection pass enclosure for the steam generator of FIG. 1.

From the top of pass No. 3, from U-shaped header 46*e*, the fluid flows upwardly in four risers 46*f*, to a similarly shaped header 48*c* of pass No. 4 (FIG. 7). The header 48*c* for the pass No. 4 feeds a U-shaped bank of tubes making up the front wall 18 hand side walls in the upper portion of the furnace, the tubes leading to an upper header 48*d* having a shape corresponding to that of the lower header and the bank of tubes.

Details of the first convection enclosure, passes Nos. 5 and 6, into which fluid from the furnace pass No. 4 is transmitted, are shown in FIG. 8. The fluid streams from the downcomers 48*e* and *f* enter on opposite sides of the furnace, distributing bottles or nozzles 50*b* and 50*c*, also on opposite sides of the furnace, each bottle or nozzle having six connections leading to headers 26*b*, 30*b* and 50*d* and *e* respectively for front screen tubes 26, rear screen tubes 30, and the side walls 50*f* and *g* of the enclosure. For purposes of clarity, the front screen tubes 26 are designated as pass No. 5, and the rear screen tubes 30 as pass No. 6. The headers 26*b* and 30*b* extend completely across the width of the furnace and are each fed via four of the connections, two from each distributing nozzle 50*b* and 50*c*, so that two from each distributing nozzle go to the header 26*b* and two to the header 30*b*. The two remaining connections from each nozzle, four in all, feed the separate headers 50*d* and 50*e* for the opposite side walls of the enclosure. It should be noted that the tubes for the rear wall of the enclosure, pass No. 6, extend for a short distance 50 contiguous with the front wall 26 of the enclosure, and with the tubes 26 make-up the upper portion of the rear wall 20 of the furnace. They then extend upwardly and rearwardly to define the sloping bottom of the enclosure. In a later description details for this tube arrangement will become more apparent. Where the gas flow is across the rear wall 30, the tubes are spread apart as shown to permit this flow. In the front wall 26 the tubes also are spread apart to permit the flow of gas. Details of the tube pattern in this are a matter of design. The upper header arrangement for the enclosure is substantially the same as that for the bottom of the enclosure, with connections between the parallel transverse headers 50*h* and 50*i* for the front and rear walls and cross headers 50*j* and 50*k* for the side walls. Connections lead from the headers to a mixing tee 50*l*; the latter dividing the flow into parallel downcomers 50*m*.

Figure 9:
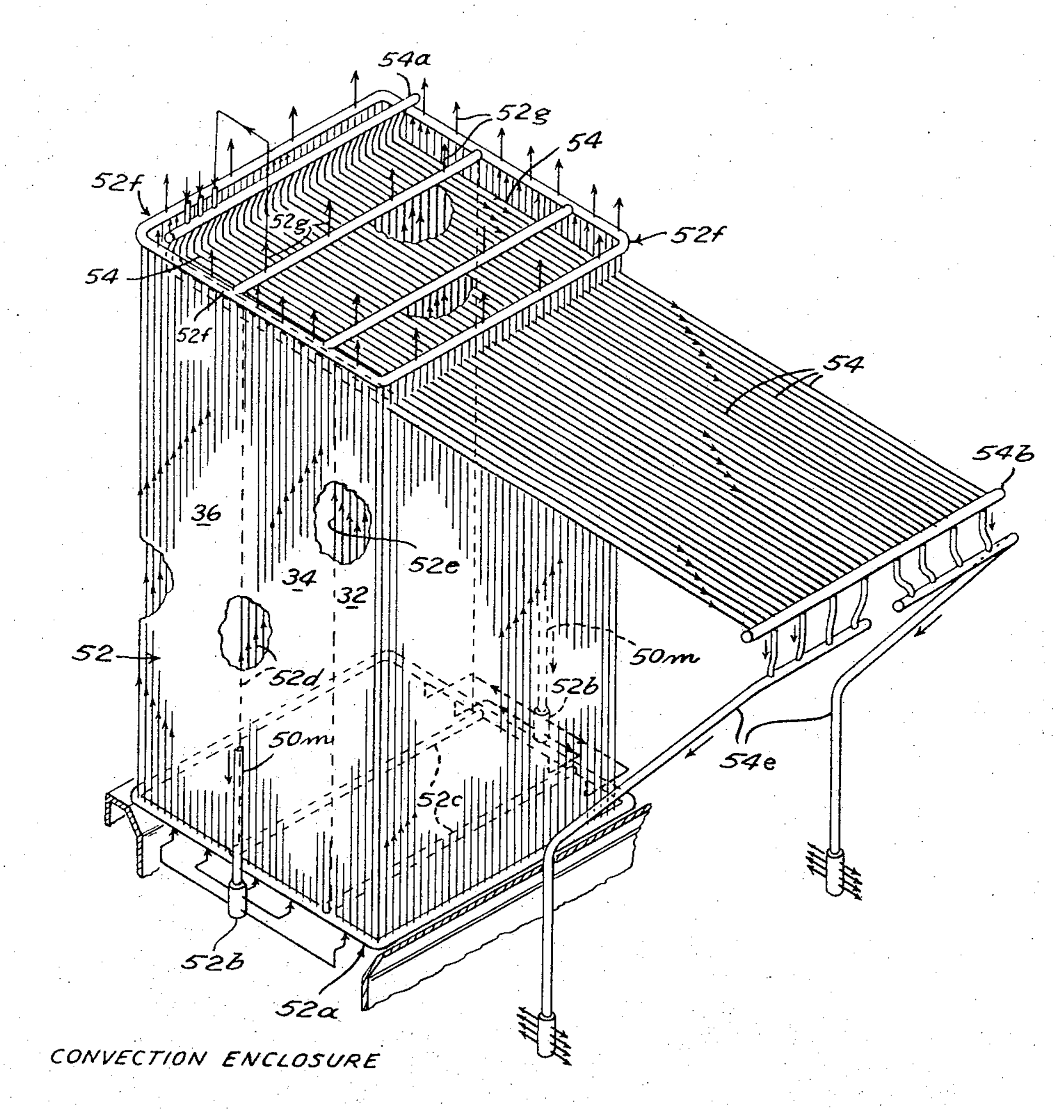
FIGURE 9 is an oblique detail of a second convection pass enclosure and roof of the unit illustrated in FIG. 1.

The second convection enclosure and the roof tubes are shown in FIG. 9. The header arrangement 52*a* for the second enclosure is somewhat similar to that for the first enclosure with the headers being shaped to feed tubes defining a rectangular shaped enclosure. In particular, the header is in the shape of a rectangle fed by tees 52*b* on opposite sides of the enclosure. Also included are cross headers 52*c* feeding division walls 52*d* and 52*e* dividing the enclosure into the economizer, reheater and superheater passes 32, 34, and 36 for the gas flow. The upper header 52*f* has a configuration similar to that of the lower header, also to the enclosure, and is provided with connections 52*g* leading to a single transverse header 54*a* feeding the roof tubes 54. The roof tubes in turn terminate in a single header 54*b*, from which downcomers 54*e* lead transmitting the fluid to the platen superheater 24, shown in FIG. 10, and the finishing superheater 28, shown in FIG. 11.

Figures 10, 11:
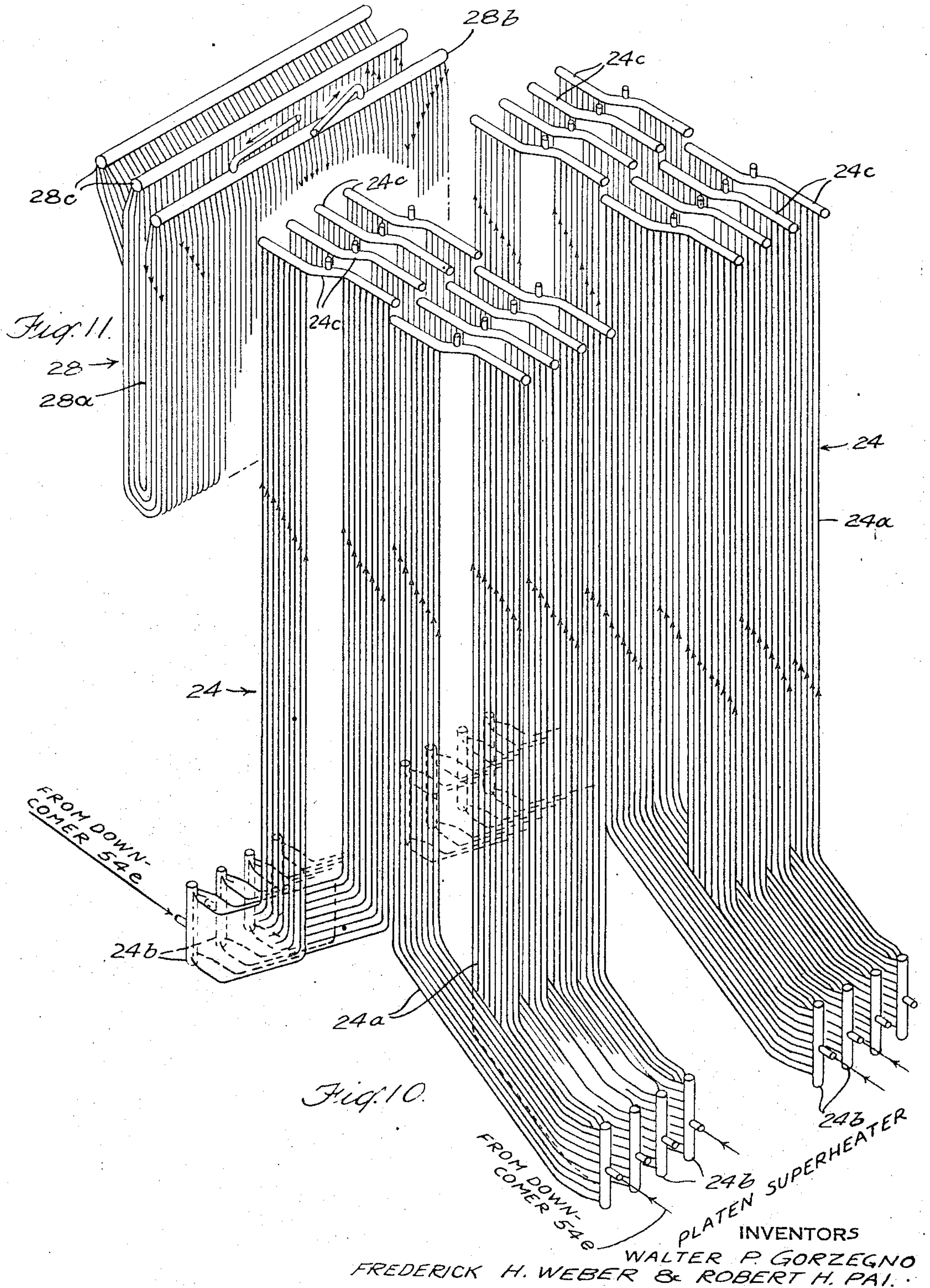
FIGURES 10 and 11 are oblique details of furnace platen arrangement and finishing superheater of the generator in FIG. 1.
Figure 12:
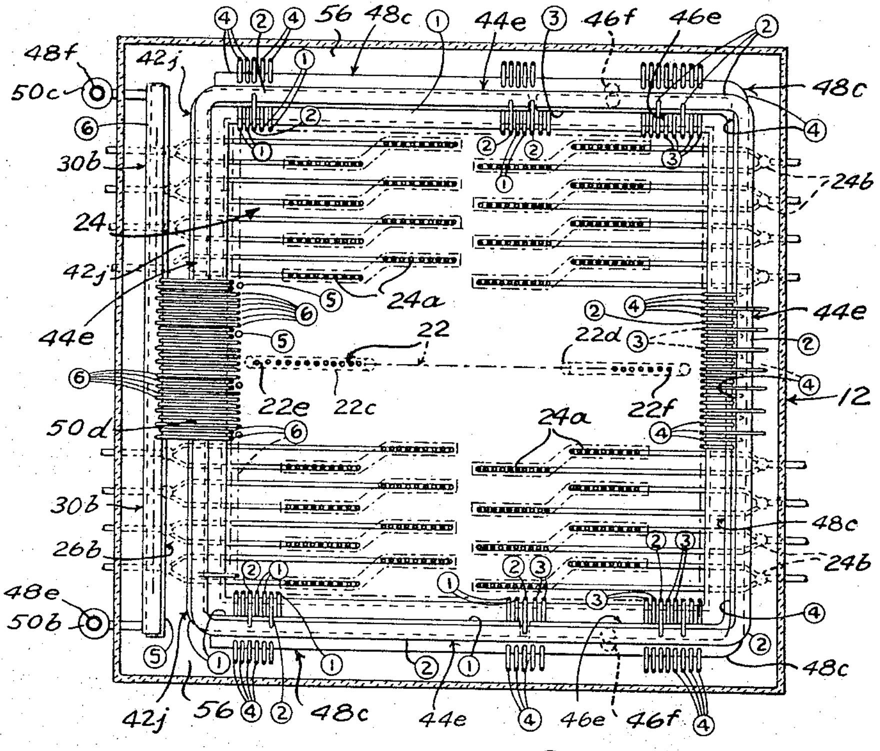
FIGURES 12 and 13 are enlarged plan section views taken along lines 12 and 13 of FIG. 1 showing top and lower headers for the passes of FIGS. 4, 5, 6, and 7.
Figure 13:
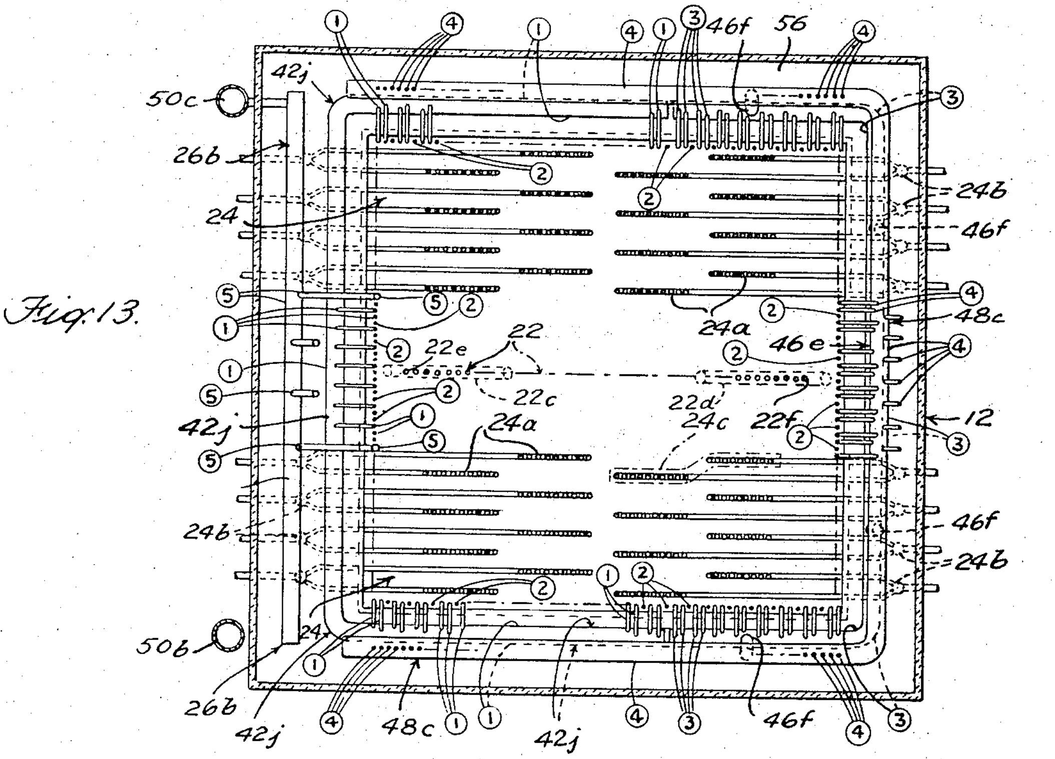

The platen superheater, FIG. 10, consists of a plurality of banks of tubes 24*a* off-set from each other, having a somewhat J-configuration, the banks being arranged to unifomly occupy the upper cells of the furnace 12 on opposite sides of the division wall 22 as shown in FIGS. 12 and 13, but at the same time being arranged to permit the flow of gases in the upper part of the furnace. The J-configuration permits the superheater tubes to be completely drainable, the tubes being fed at the inlet end by a plurality of vertical headers 24*b* feeding pairs of banks of the superheater, and terminating at the outlet end in horizontal headers 24*c* appropriately connected to the finishing superheater bank. The latter comprises a series of U-shaped tubes 28*a*, leading from a single inlet header 28*b* and terminating in parallel headers 28*c*.

The steam generator illustrated is top supported by a suitable framework not shown permitting free expansion. This means that the tubular elements of the vapor generator must be suspended from the top, and the lower passes suspended from the upper pass or passes. For instance, the platen superheater elements 24 are suitably suspended from the top, as well as the furnace pass No. 4, and the convection enclosure passes Nos. 5 and 6. In the embodiment illustrated, the furnace passes No. 1, 2 and 3 are suitably connected to the passes 4–6 so that they also are suspended from the top.

Figure 14A:
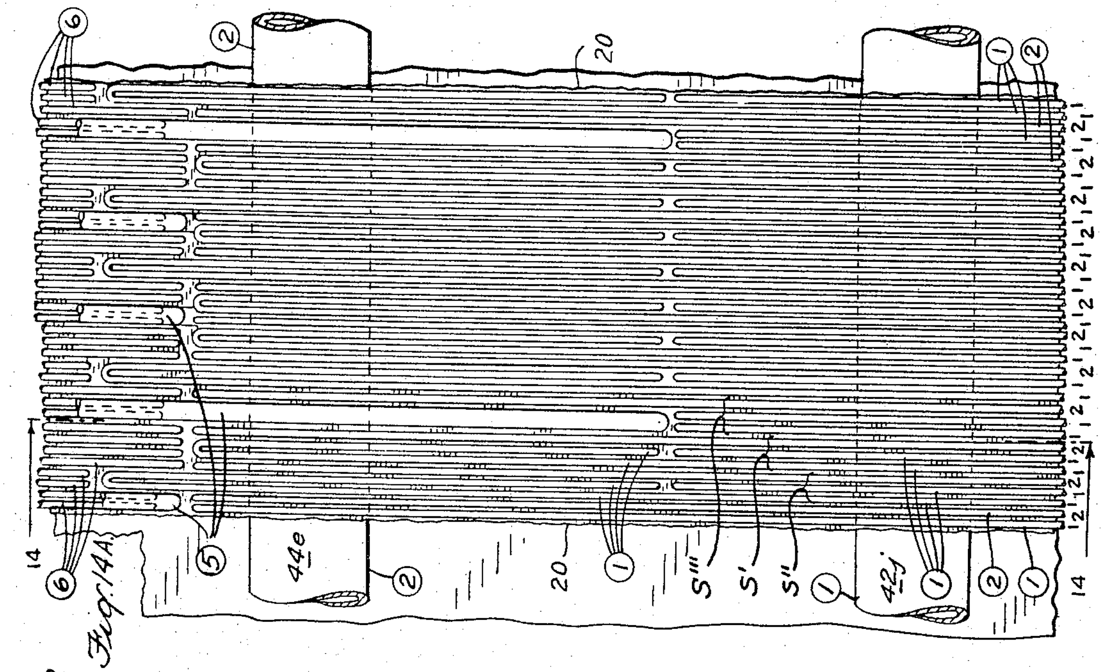
FIGURES 14 and 14A are enlarged section and front elevation views showing details of the horizontal joint headers for the rear furnace wall of the unit of FIG. 1.
Figure 14:
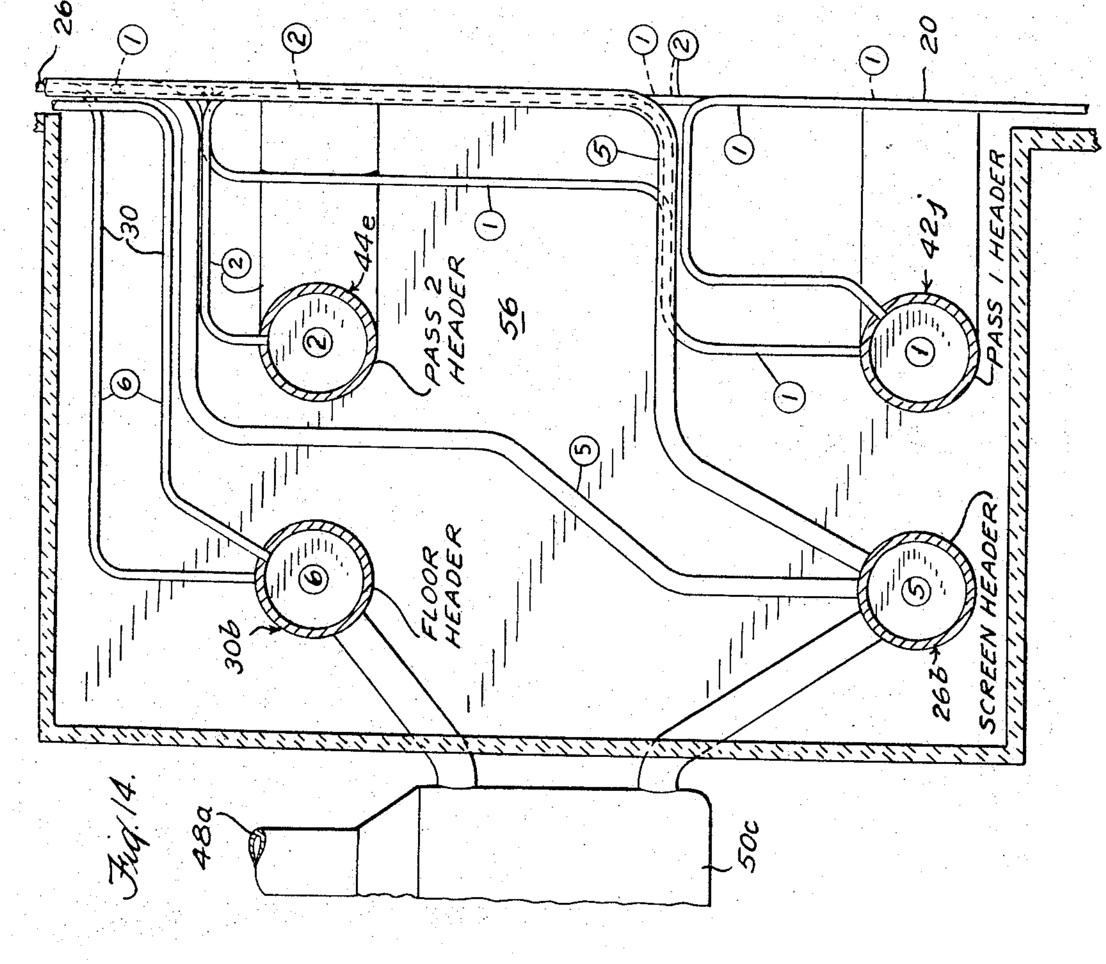
Figure 15A:
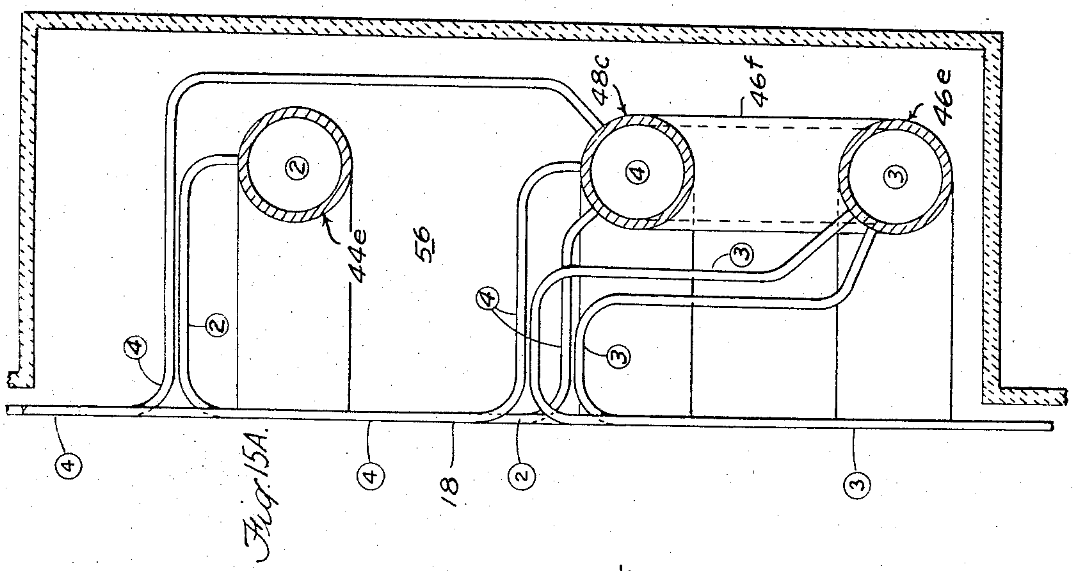
FIGURES 15 and 15A are enlarged section and front elevation views showing details of the horizontal joint headers for the front furnace wall of the unit illustrated in FIG. 1.
Figure 15:
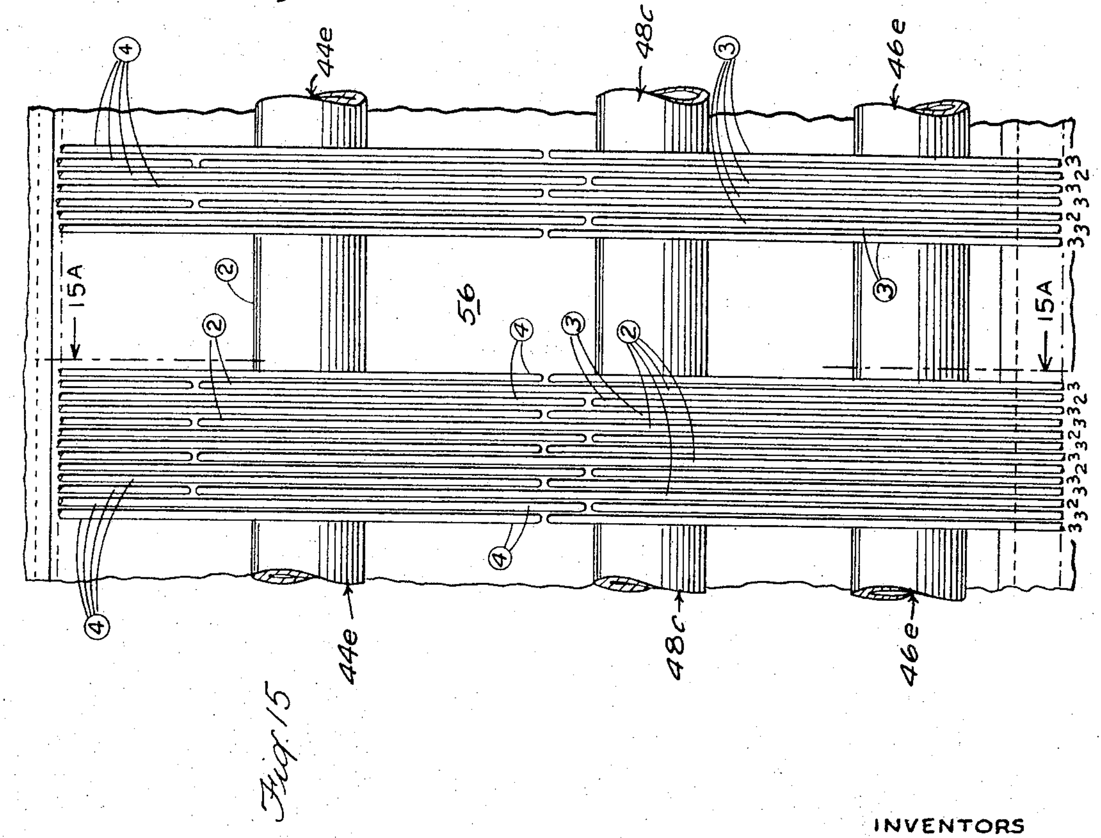

FIGS. 12, 13, 14, 14A, 15, and 15A illustrate the manner in which this is accomplished, FIGS. 14 and 14A illustrating the arrangement with respect to the rear wall 20, FIGS. 15 and 15A illustrating the arrangement with respect to the front wall 18. Reference can also be had to FIG. 1 for purpose of illustration.

Referring to FIGS. 14, 14A and FIG. 1, an annular recess 56 is formed in the rear wall 20, and the headers 42*j* and 44*e* for the first and second passes (FIGS. 4 and 5), 30*b* for the floor of the first convection enclosure (pass No. 6, FIG. 8), and 26*b* for the screen tubes (pass No. 5, FIG. 2) are located within the recess. It will be recalled that the rear wall of the furnace is composed, in the lower portion of the furnace, of tubes from passes Nos. 1 and 2, and in the upper portion of the furnace, of the screen tubes 26 and 30 of the convection enclosure 50. The headers 42*j* and 44*e* for the passes Nos. 1 and 2 are disposed immediately above each other in the front of the recess, with the headers 30*b* and 26*b* for the floor and screen tubes (passes 6 and 5) in the rear part of the recess. This arrangement also is shown in FIGS. 12 and 13. For instance, in FIG. 13, the screen tube header 26*b* (pass 5) is shown as an elongated straight member in the back of the recess with the U-shaped header 42*j* for pass No. 1 in front of it. Above, in FIG. 12, the straight header 30*b* (pass 6) and the rectangular header 44*e*( pass 2) are located.

Referring again to FIGS. 14 and 14A, the tubes of pass No. 1 in the lower part of the furnace mix with those of pass No. 2, the grouping being two tubes of pass No. 1 followed by a single tube of pass No. 2. The tubes of pass No. 2 all bend at right angles near the top of the recess 56 to enter the recess, extending to header 44*e*. In each 1–1–2 group, at least one tube of pass No. 1 bends at right angles about a third of the way up the recess, enters the recess and extends to header 42*j*. The remaining tube of pass No. 1 for each group may either be coextensive with and extend to the point of entry of the tubes of pass No. 2 (sequence S′, FIG. 14A), or extend beyond this point of entry (sequence S″) or below it (sequence S‴). If the tubes are coextensive with or longer than those of pass No. 2, (sequences S′ and S″), they make a U-bend and return to about the point of entry, supra, of the other tube of pass 1, about a third of the way up, bending at right angles to enter the recess. In the third instance (sequence S‴), this remaining tube of each grouping enters the recess with the first tube of pass No. 1, at the above-mentioned point of entry for the first tube, about a third of the way up the recess.

From the top down, the screen tubes leaving header 26*b*, given the designation ⑤, follow two paths, one out of three extending down to about the point of entry, above-mentioned, about a third of the way up the recess, the remaining leaving near the top of the recess adjacent the tubes of pass No. 2, Those continuing down the face of the recess are strength-welded with the tubes of pass No. 2 along portions which are coextensive. The other screen tubes of pass 5 are strength-welded to those tubes of pass No. 1 which extend beyond the upper point of entry.

Mixed with the screen tubes and entering the recess near the top are the convection enclosure tubes originating from header 30*b*, designated as ⑥. These tubes are also welded to certain ones of pass No. 1. It should be noted that some of the tubes of the pass No. 6 are spaced behind, and some aligned with, the screen tubes of pass No. 5.

In the above way, the lower passes Nos. 1 and 2 are supported by the upper tubes of passes Nos. 5 and 6, but details of the arrangement may be a matter of design.

In addition to functioning as a support connection, the tubes of the passes Nos. 1, 2, 5, and 6 screening the recess 18 form a gas-tight enclosure. This arrangement occurs only in the rear wall of the furnace as shown in FIGS. 12 and 13.

For the front wall and sides of the furnace, FIGS. 15 and 15A, the situation is somewhat different. Specifically, for the front wall and front portions of the side walls, it will be recalled that the tubes of pass No. 2 are intermixed with those of pass No. 3. At a point about halfway up the recess 56, the tubes of pass No. 3 divide and lead into the recess at two levels, one slightly above the other, to the header 46*e* for pass No. 3. Those for pass No. 2 extend on upwardly to near the top of the recess before leading into the recess to header 44*e*, for pass No. 2, also near the top of the recess. From the top, the tubes for pass No. 4 split, some entering the recess near the top adjacent the tubes for pass No. 2, and some continuing on downward entering the recess in the area of the header 48*c* for pass No. 4. The tubes of the various passes are suitably strength-welded together so that the tubes of pass No. 4 support those for passes Nos. 2 and 3.

The invention has been described with reference to a V-shaped hopper bottom. Principles of the invention are equally applicable to a flat bottom furnace, illustrated in this respect in FIG. 16. The essential difference between the embodiment of FIG. 16 and the embodiment of FIG. 2 is the arrangement of headers near the bottom. For the vapor generator of FIG. 16, the furnace pass No. 1 is fed by a U-shaped header 42*l*, the ends of which abut another U-shaped header 46*g* for pass No. 3. The header 44*g* for pass No. 2 has the configuration of a square. It is noted that the rear wall and rear portions of the side walls are composed of tubes of passes Nos. 2 and 1, and those for the front wall of tubes of passes Nos. 2 and 3. The upper headers for these passes, 42*j*, 46*e*, and 44*e*, have the same configuration as those for the embodiment of FIG. 2, and in other respects, the generator of FIG. 16 resembles the generator of FIG. 2.

Figures 16, 17:
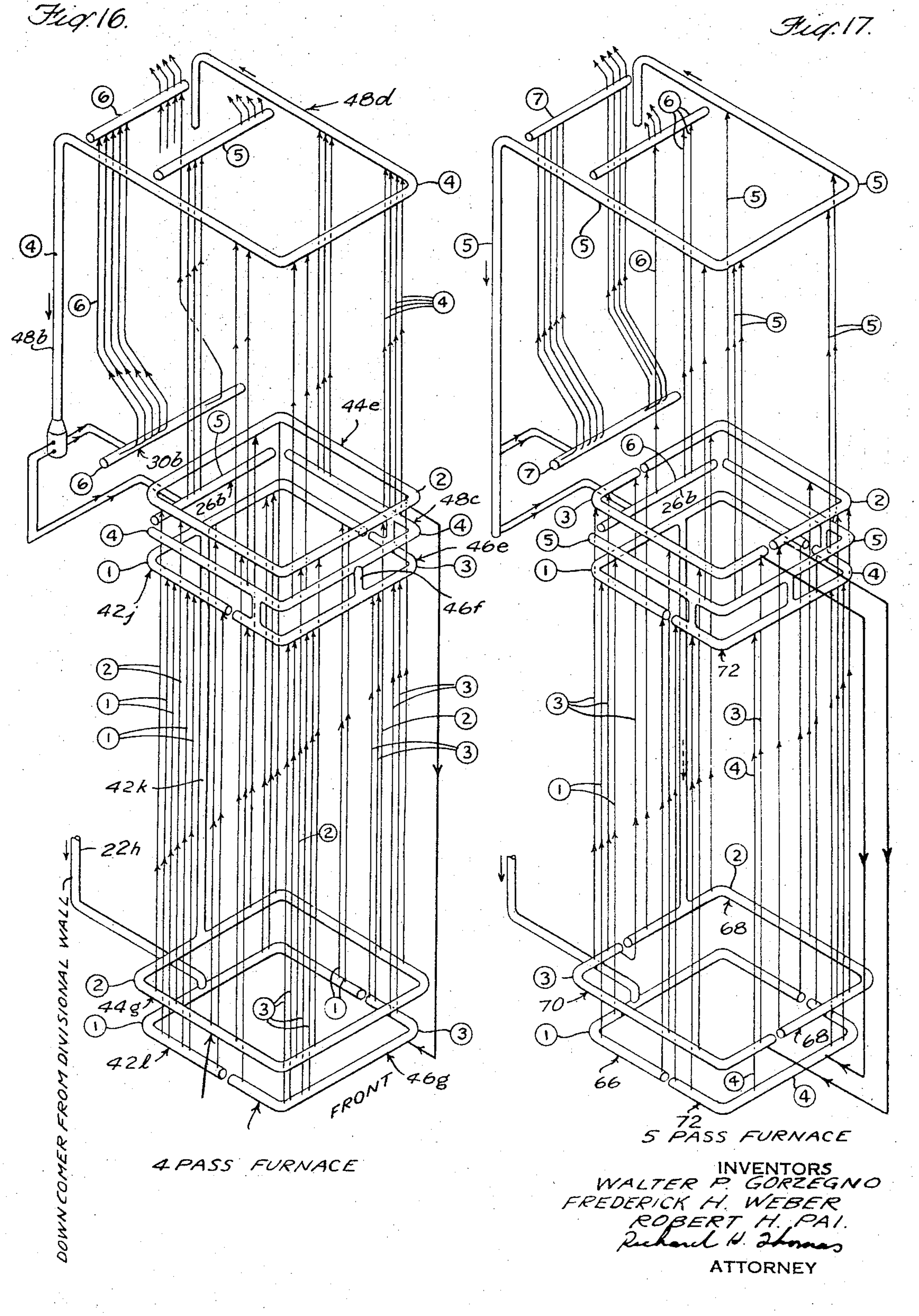
FIGURE 16 is an oblique schematic view of a four pass furnace enclosure arrangement of an embodiment of the unit illustrated in FIG. 1.
FIGURE 17 is an oblique schematic view of a five-pass alternate furnace enclosure arrangemnt in accordance with the invention.

FIG. 17 illustrates the invention with respect to a five pass design as compared to the four pass design of FIGS. 16 and 2. In the FIG. 17 example, pass No. 1 feeds the rear wall and rear portions of the side wall, and utilizes a U-shaped lower header 66. Pass No. 2 makes up one side wall, portions of the front and rear walls abutting the side wall, utilizing a lower U-shaped header 68, and pass No. 3 makes up the opposite side wall and portions of the front and rear walls adjoining this side wall, utilizing another U-shaped header 70. Pass No. 4 utilizes a fourth U-shaped header 72, and makes up the front wall and front portions of the side walls. Accordingly, the rear wall will be composed on one side of tubes of passes Nos. 1 and 3, and on the other side of tubes of passes Nos. 1 and 2. The front wall will be composed of passes Nos. 4 and 3, and 4 and 2, respectively. The side walls will be composed of passes Nos. 1 and 3 and Nos. 1 and 2 towards the rear, and passes Nos. 4 and 3, and Nos. 4 and 2 respectively towards the front.

It is contemplated that a membrane type wall construction will be used wherein the furnace enclosure is formed by welding adjacent tubes together along their length.

For a forced flow once-through generating unit where supercritical water and steam are employed, suitably sized pipe connections may be used to connect the multiple passes, with pass outlet and inlet headers properly sized to limit fluid flow unbalance caused by fluid end flow in these headers.

Figure 19:
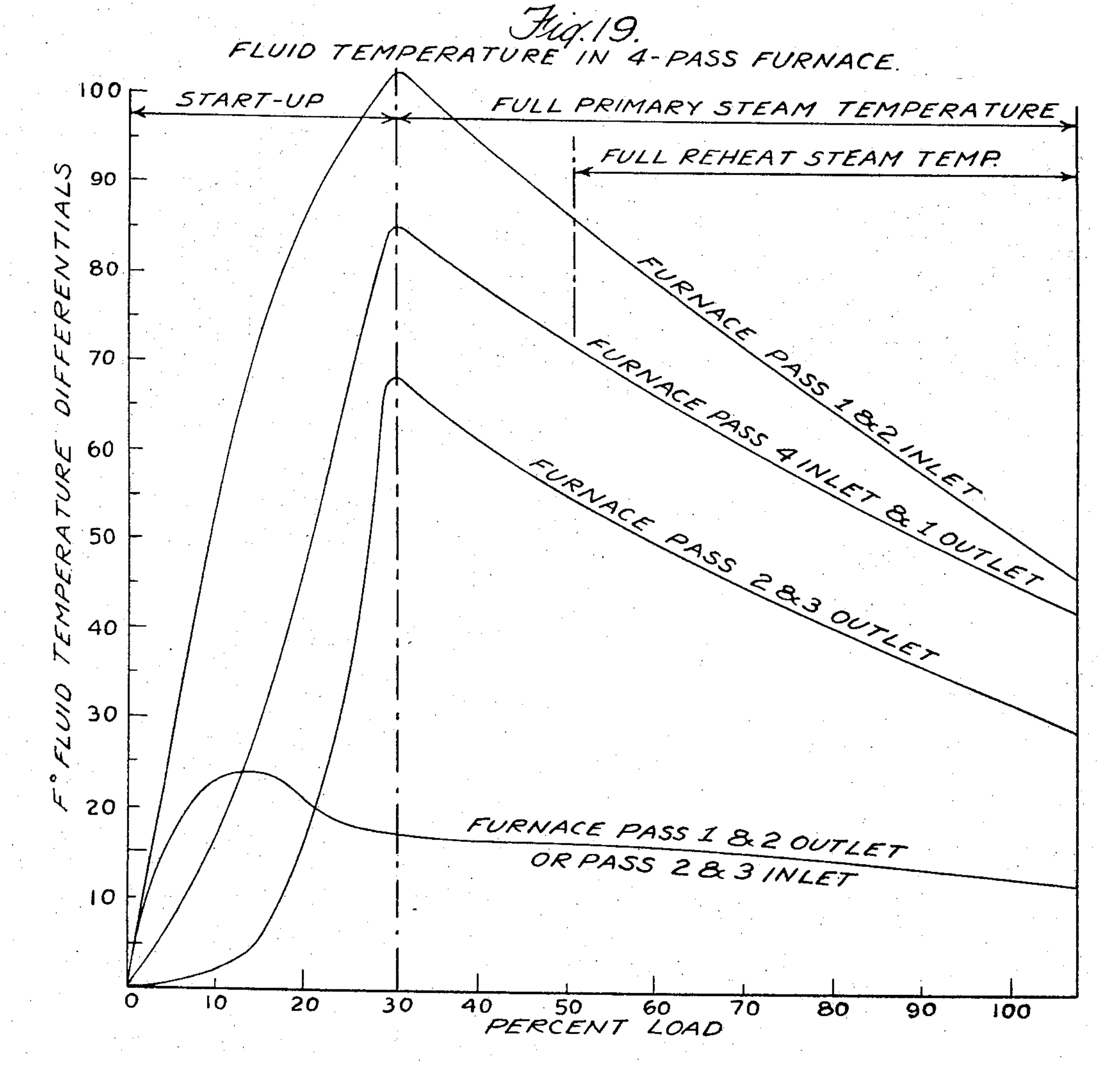
FIGURE 19 is a plot of fluid temperature differentials between passes vs. percent lead for the four pass furnace enclosure arrangement depicted in FIGURE 1.

Advantages of the invention should now be apparent. FIG. 19 illustrates, in the four pass furnace of FIG. 2, the fluid temperatures differentials in the heating cycle at various loads. Because of the plurality of furnace circuits and careful location of these circuits, in no section of the furnace does the difference in temperature between adjacent tubes exceed 100° F. By limiting temperature differentials to 100° F. resulting thermal stresses are kept to low levels giving good structural design. This is achieved without the necessity of constant operation of a gas recirculation fan.

Figure 20:
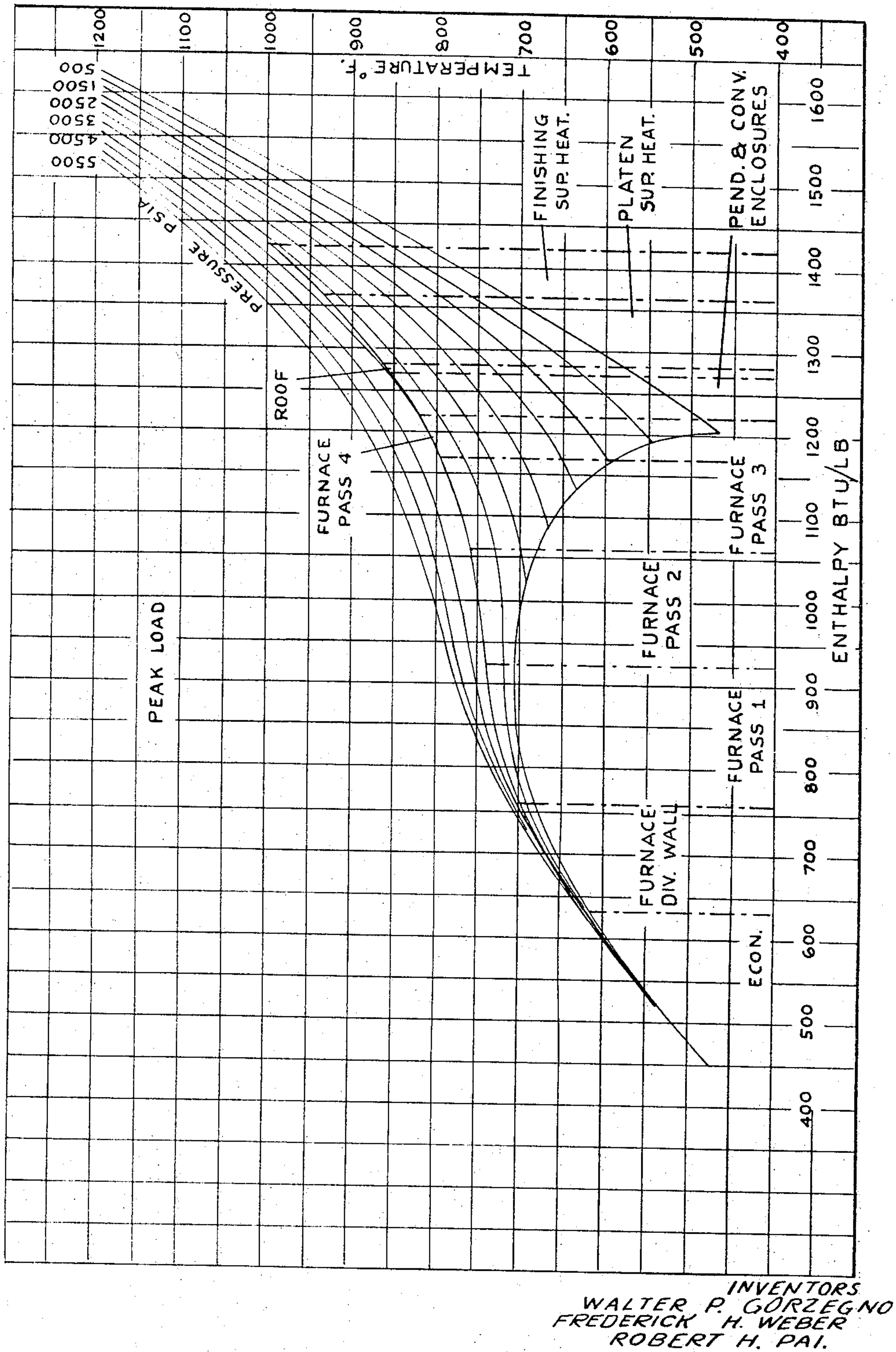
FIGURE 20 contains a graph illustrating enthalpy pickup in a four pass furnace in accordance with the invention.

In addition, the circuit arrangement is such that the fluid enthalpy pick-up of a given enclosure pass is small (as shown by FIG. 20) and well within limits so that fluid flow unbalance caused by absorption or furnace heat upset is held to a minimum. In this respect, a full mix between passes prevents carryover of fluid temperature and flow unbalance from one pass to another, an the disposition of passes in the furnace allows a greater tolerance for uneven heat absorption around the periphery of the furnace.

Also, the disposition of passes provides an upflow in all tubes in the furnace periphery giving good circuit characteristics from a stability and sensitivity point of view. In this respect, the passes can be designed for optimum fluid cooling mass flows—lbs./hour-square feet—to effect the desired cooling of tube metal, whereby minimum fluid pressure drop can be achieved in the unit. Representative mass flows are as follows:

TABLE 1.—4 PASS FURNACE

| Pass | G (mass flow), lbs./hr.-sq. ft. | Cold Water Velocity, ft./sec. at 62° F. |
|---|---|---|
| 1 | $1.0\times10^6$ | 8.1 |
| 2 | $2.1\times10^6$ | 9.5 |
| 3 | $2.5\times10^6$ | 11.3 |
| 4 | $1.0\times10^6$ | 4.5 |

TABLE 2.—5 PASS FURNACE

| Pass | G (mass flow), lbs./hr.-sq. ft. | Cold Water Velocity, ft./sec. at 62° F. |
|---|---|---|
| 1 | $1.6\times10^6$ | 7.1 |
| 2 | $1.78\times10^6$ | 7.9 |
| 3 | $2.17\times10^6$ | 9.7 |
| 4 | $2.5\times10^6$ | 11.1 |
| 5 | $0.696\times10^6$ | 3.1 |

The unique platen superheater arrangement in the upper portion of the furnace enclosure is fully drainable and has parallel flow of heating gases and cooling fluid to minimize tube metal temperatures as compared to those experienced in typical pendant platen ararngements. Also, the unique mix header arrangement permits the transfer of structural load from the plurality of passes in the lower furnace to the single upper furnace pass and furnace screen.

While in accordance with the provisions of the statute. We have illustrated and described herein the best form of the invention now known to us, those skilled in the art will understand that changes may be made in the form of the apparatus disclosed without departing from the spirit and scope of this invention covered by the claims, and certain features of the invention may sometimes be used to advantage without a corresponding use of other features.

What is claimed is:

1. A forced flow once-through vapor generated for use with high pressure, intermediate pressure and low pressure turbines, the generator including in once-through flow relationship an economizer surface, vapor generating furnace circuitry, superheating surface and reheat surface for the intermediate and low pressure turbines; comprising a furnace enclosure defined by said furnace circuitry;
burner means near the bottom of the furnace enclosure;
gas outlet means near the top of the enclosure;
a gas passage means in communication with the gas outlet means, the passage means comprising at least three gas passes in parallel;
the reheat surface comprising separate intermediate and low pressure reheater sections to reheat the vapor flow to said intermediate and low pressure turbines respectively;

two of the parallel gas passes housing one each of said intermediate and low pressure reheater sections;

the third of said gas passes being substantially fully occupied by and housing substantially all of said economizer surface; and baffle means for each of said three passages to vary the respective heat transfer to the reheater sections.

2. A generator according to claim 1 wherein said gas passage means is L-shaped extending horizontally from the gas outlet means of the furnace enclosure and downwardly, the parallel gas passes being disposed in the downwardly extending portion of the gas passage means, the superheating surface being disposed at least in part in the horizontal extending portion of the gas passage means.

References Cited

UNITED STATES PATENTS

| | | | |
|---|---|---|---|
| 3,033,177 | 5/1962 | Koch et al. ---------- | 122—235 |
| 3,102,514 | 9/1963 | Armacost ----------- | 122—480 |

KENNETH W. SPRAGUE, *Primary Examiner.*